(12) United States Patent
Hakes et al.

(10) Patent No.: US 10,752,304 B2
(45) Date of Patent: Aug. 25, 2020

(54) REPLACEABLE SPROCKET LUGS

(71) Applicant: Caterpillar Inc., Peoria, IL (US)

(72) Inventors: David J. Hakes, Princeville, IL (US); Benoit Abello, Dunlap, IL (US); Gustavo L. Acosta, Flossmoor, IL (US)

(73) Assignee: Caterpillar Inc., Peoria, IL (US)

( * ) Notice: Subject to any disclaimer, the term of this patent is extended or adjusted under 35 U.S.C. 154(b) by 265 days.

(21) Appl. No.: 15/848,328

(22) Filed: Dec. 20, 2017

(65) Prior Publication Data

US 2019/0185078 A1     Jun. 20, 2019

(51) Int. Cl.

| B62D 55/13 | (2006.01) |
|---|---|
| B62D 55/135 | (2006.01) |
| F16H 55/17 | (2006.01) |
| B62D 55/125 | (2006.01) |

(52) U.S. Cl.
CPC ......... B62D 55/135 (2013.01); B62D 55/125 (2013.01); B62D 55/13 (2013.01); F16H 55/17 (2013.01); F16H 2055/175 (2013.01)

(58) Field of Classification Search
CPC .............................. B62D 55/12; B62D 55/135
See application file for complete search history.

(56) References Cited

U.S. PATENT DOCUMENTS

| 1,638,140 | A | * | 8/1927 | Best ...................... B62D 55/135 |
|---|---|---|---|---|
| | | | | 305/199 |
| 2,258,225 | A | | 10/1941 | Shores |
| 3,069,922 | A | | 12/1962 | Harvey |
| 3,111,859 | A | | 11/1963 | Malone |
| 3,168,836 | A | | 2/1965 | Militana |
| 3,439,551 | A | | 4/1969 | Militana |
| 3,504,562 | A | * | 4/1970 | Hirych ............... B62D 55/0963 |
| | | | | 474/161 |
| 3,730,013 | A | * | 5/1973 | Slemmons ......... B62D 55/0963 |
| | | | | 474/156 |
| 3,899,219 | A | * | 8/1975 | Boggs ...................... B60S 1/68 |
| | | | | 305/115 |
| 3,960,412 | A | | 6/1976 | Caterpillar |
| 4,111,064 | A | | 9/1978 | Purcell |
| 4,616,883 | A | * | 10/1986 | Edwards ................ B62D 25/12 |
| | | | | 305/199 |
| 5,203,861 | A | | 4/1993 | Irwin |
| 7,798,579 | B2 | * | 9/2010 | Mulligan ............... B62D 55/12 |
| | | | | 305/193 |
| 9,194,476 | B2 | | 11/2015 | Balash |
| 2004/0061378 | A1 | | 4/2004 | Girard et al. |
| 2014/0333125 | A1 | * | 11/2014 | Hoyt ...................... B62D 55/12 |
| | | | | 305/199 |

FOREIGN PATENT DOCUMENTS

| GB | 2410516 | 8/2005 |
|---|---|---|
| WO | 2008006225 | 1/2008 |
| WO | 2017185174 | 11/2017 |

* cited by examiner

Primary Examiner — Jason R Bellinger
(74) Attorney, Agent, or Firm — Law Office of Kurt J. Fugman LLC (57) ABSTRACT

A lug forms an enclosure including a bottom surface defining an aperture that receives the projection of a sprocket, and a side surface defining an aperture that receives a retaining mechanism.

17 Claims, 9 Drawing Sheets

REPLACEABLE SPROCKET LUGS

TECHNICAL FIELD

The present disclosure relates to a sprocket used to drive a track chain assembly of an endless undercarriage drive employed by earth moving, construction and mining equipment and the like. Specifically, the present disclosure relates to a sprocket that is configured to have replaceable sprocket lugs attached and detached from the sprocket.

BACKGROUND

Earth moving, construction and mining equipment and the like are often used in rough, off-road terrain. These machines often employ an endless drive with track shoes that is better able to propel the machines in such environments over obstacles and uneven terrain, etc. The track chain assemblies, which include shoes, are held together by a series of interconnected track links, pins and bushings that are supported on the drive sprocket, idler and support rollers of the machine. The drive sprocket, is so called, as it may drive or convey power to the track chain assembly, causing it to revolve about the idler wheels, resulting in linear motion of the machine.

The drive sprocket includes lugs that fit between various inside and outside links of the track chain assembly and typically contact a track chain bushing that spans between the adjacent inside track links and outside track links. As the drive sprocket rotates, a first lug pushes the track chain assembly along a direction by pushing on the track chain bushing. Eventually, the first lug disengages the track chain bushing as a second lug disposed immediately behind the first lug contacts another track chain bushing, forcing the track chain assembly to continue to move along the same direction.

As can be imagined, there can be a great deal of force on the lugs and abrasive material such as sand, dirt, rocks, etc. may cause the lugs to wear over time. The lugs may become worn to the point that the lugs can no longer effectively contact the track bushings or otherwise propel the movement of the track chain assembly. When this happens, the machine and track will need to be serviced. Repairing or replacing sprockets and/or their lugs may be time consuming or be costly in other ways.

One proposed solution to these problems has been disclosed in U.S. Pat. Application Publication No. 2014/0333125 to Hoyt. FIGS. 3, 6 and 14 of Hoyt show a plurality of teeth 150 extending radially outwardly from a sprocket hub 152. The sprocket hub may further include a plurality of radially extending mounting projections 162. Each tooth may be secured to each projection by a set screw or a retention pin 222. It has been found that these retention methods have not been as robust as desired. Retention pins and set screws may become loose and fall out. If this happens, then the tooth may become loose and fall off the drive sprocket. If this occurs in the field, the machine may have to be towed back to a servicing station or serviced in the field. Either scenario may be inconvenient or costly.

SUMMARY

Sprocket assemblies and lugs that may be attached using a retaining mechanism to a hub to form such assemblies according to various embodiments of the present disclosure are described herein.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

Various embodiments of an apparatus and a method for providing and/or assembling a sprocket with replaceable lugs will now be described. In some embodiments, the sprocket has a particular configuration. In other embodiments, the replaceable lugs for use with the sprocket has a particular configuration. Other configurations for either the lugs or the sprocket are possible other than what is specifically shown in the figures of the present application.

Figure 1:
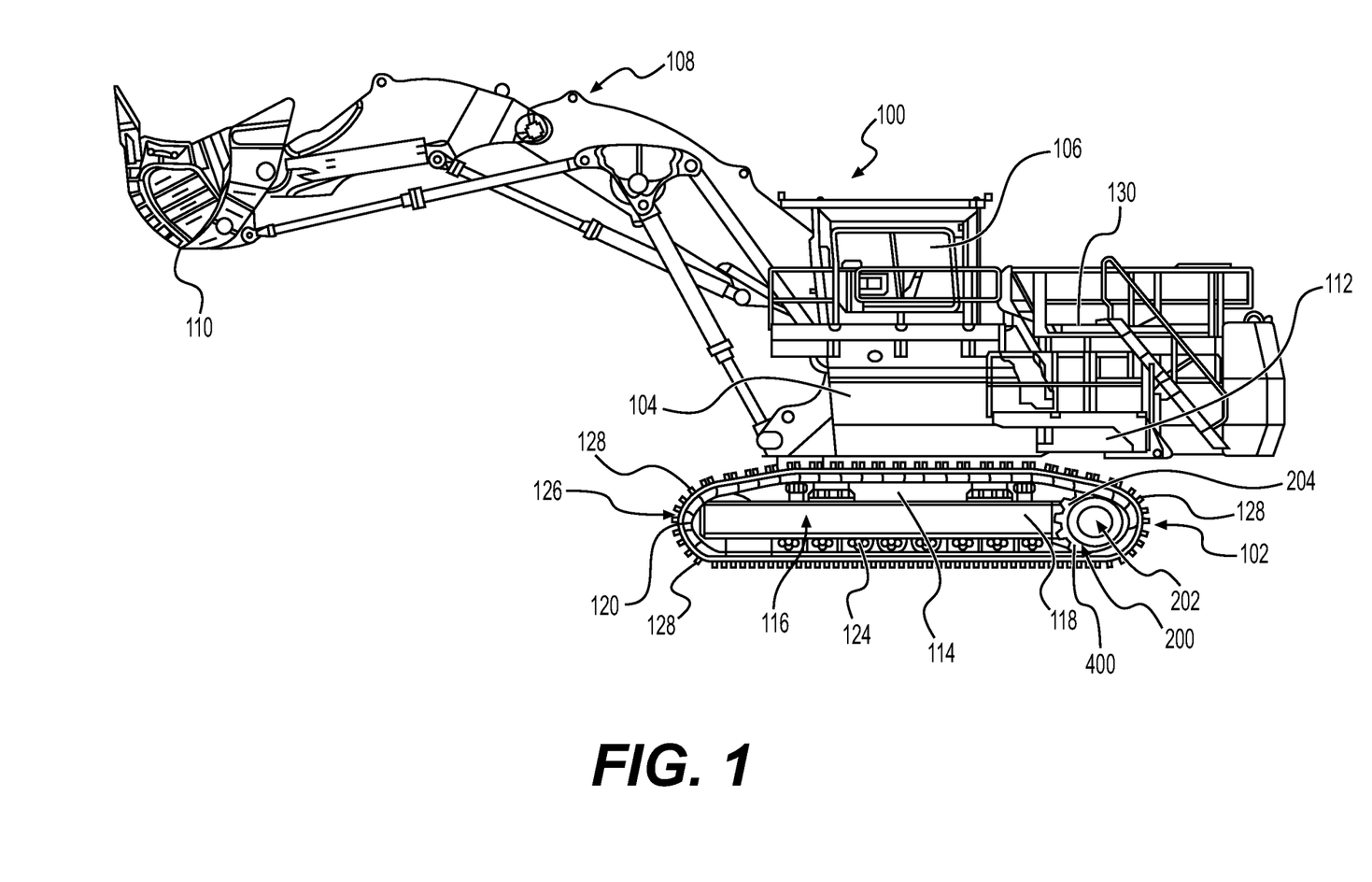
FIG. 1 is a side-view of a machine such a hydraulic mining shovel that may use sprockets with replaceable lugs according to various embodiments of the present disclosure.

FIG. 1 shows an embodiment of a tracked machine in the form of a hydraulic mining shovel that includes an embodiment of a track system constructed in accordance with principles of the present disclosure. Among other uses, a hydraulic mining shovel can be used to load overburden and ore into haul trucks during the mining process in various surface mine applications.

While the arrangement is illustrated in connection with a hydraulic mining shovel, the arrangement disclosed herein has universal applicability in various other types of machines commonly employ track systems, as opposed to wheels. The term "machine" may refer to any machine that performs some type of operation associated with an industry such as mining, earth moving or construction, or any other industry known in the art. For example, the machine may be an excavator, wheel loader, cable shovel, dozer, or dragline or the like. Moreover, one or more implements may be connected to the machine. Such implements may be utilized for a variety of tasks, including, for example, lifting and loading.

As shown in FIG. 1, the machine 100 may include a body 104, with a track system 102 attached thereto, and also has a cab 106 to house a machine operator. The machine may also include a boom system 108 pivotally connected at one end to the body 104 and supporting an implement 110 at an opposing, distal end. In embodiments, the implement 110 can be any suitable implement, such as a bucket, a clamshell, a blade, or any other type of suitable device. A control system can be housed in the cab 106 that can be adapted to allow a machine operator to manipulate and articulate the implement 110 for digging, excavating, or any other suitable application.

The body 104 may be supported on a main frame 112 supported on an undercarriage structure 114. The undercarriage structure 114 includes a supporting structure 118 that supports the track system 102 utilized for movement of the machine 100. The track system 102 may include first and second track roller frame assemblies 116, which are spaced from and adjacent respective first and second sides of the undercarriage structure 114. It will be appreciated that only one of the track roller frame assemblies 116 is visible in FIG. 1.

Each of the track roller frame assemblies 116 carries an idler wheel 120, a drive sprocket assembly 200 and a plurality of track guiding rollers 124. The drive sprocket assembly 200, 300 is powered in forward and reverse directions by the machine 100. An endless track chain assembly 126 encircles each drive sprocket assembly 200 the idler wheel 120, and the track guiding rollers 124. The track chain assembly 126 includes a plurality of interconnected track pads 128, also referred to as track chain members herein. The track guiding rollers 124 guide the track pads 128 as the track chain assembly 126 is driven by the drive sprocket wheel assembly 200. The track chain assembly 126 may have any track chain member, track pin retention device, and/or track chain assembly. A power source 130 supplies the power to drive the track chain assembly 126 via the sprocket assembly 200 as the lugs 400 of the sprocket assembly 200 engage the various track bushings (not shown), propelling the movement of the track chain assembly 126 as described earlier herein.

Power source 130 may drive undercarriage assembly 104 of machine 100 at a range of output speeds and torques. Power source 130 may be an engine such as, for example, a diesel engine, a gasoline engine, a gaseous fuel-powered engine, or any other suitable engine. Power source 130 may also be a non-combustion source of power such as, for example, a fuel cell, a power storage device, or any other source of power known or that will be devised in the art.

For example, as shown in FIG. 1, the sprocket assembly 200 may comprise a hub 202 that is connected to a drive axle (not shown) of the machine 100 and a sprocket rim 204 that is attached to the radial outer edge of the hub 202. This sprocket rim 204 may form the lugs that help to propel the track chain assembly 126.

Figure 2:
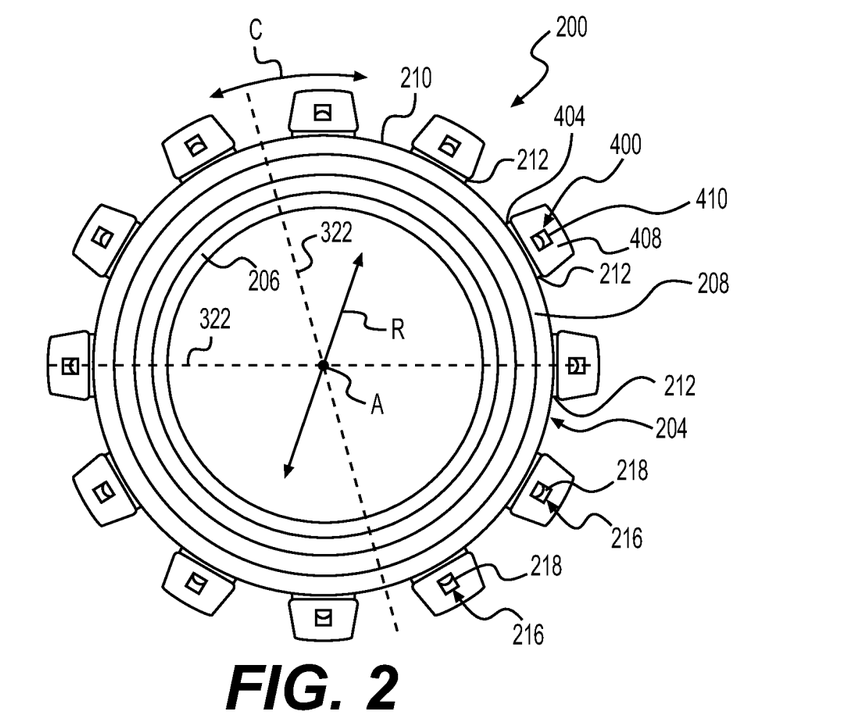
FIG. 2 is a side view of a sprocket assembly with replaceable lugs according to an embodiment of the present disclosure removed from the machine of FIG. 1. A side mounted retention system to attach and detach the replaceable lugs is utilized. As shown, the lugs are attached to the rim of the sprocket.
Figure 3:
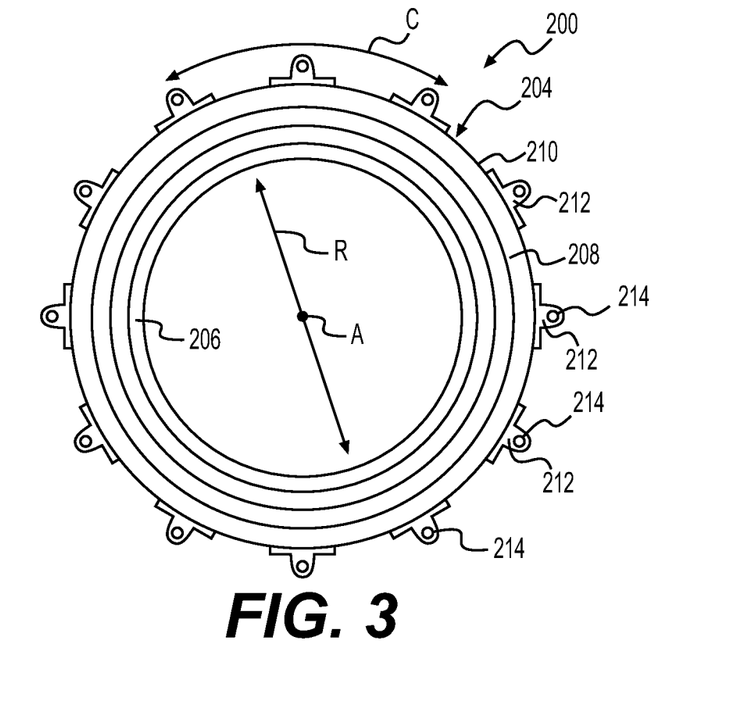
FIG. 3 is a side view of the sprocket assembly of FIG. 2, with the lugs removed, revealing mounting ears used to retain the lugs onto the projections extending from the rim of the sprocket.
Figure 4:
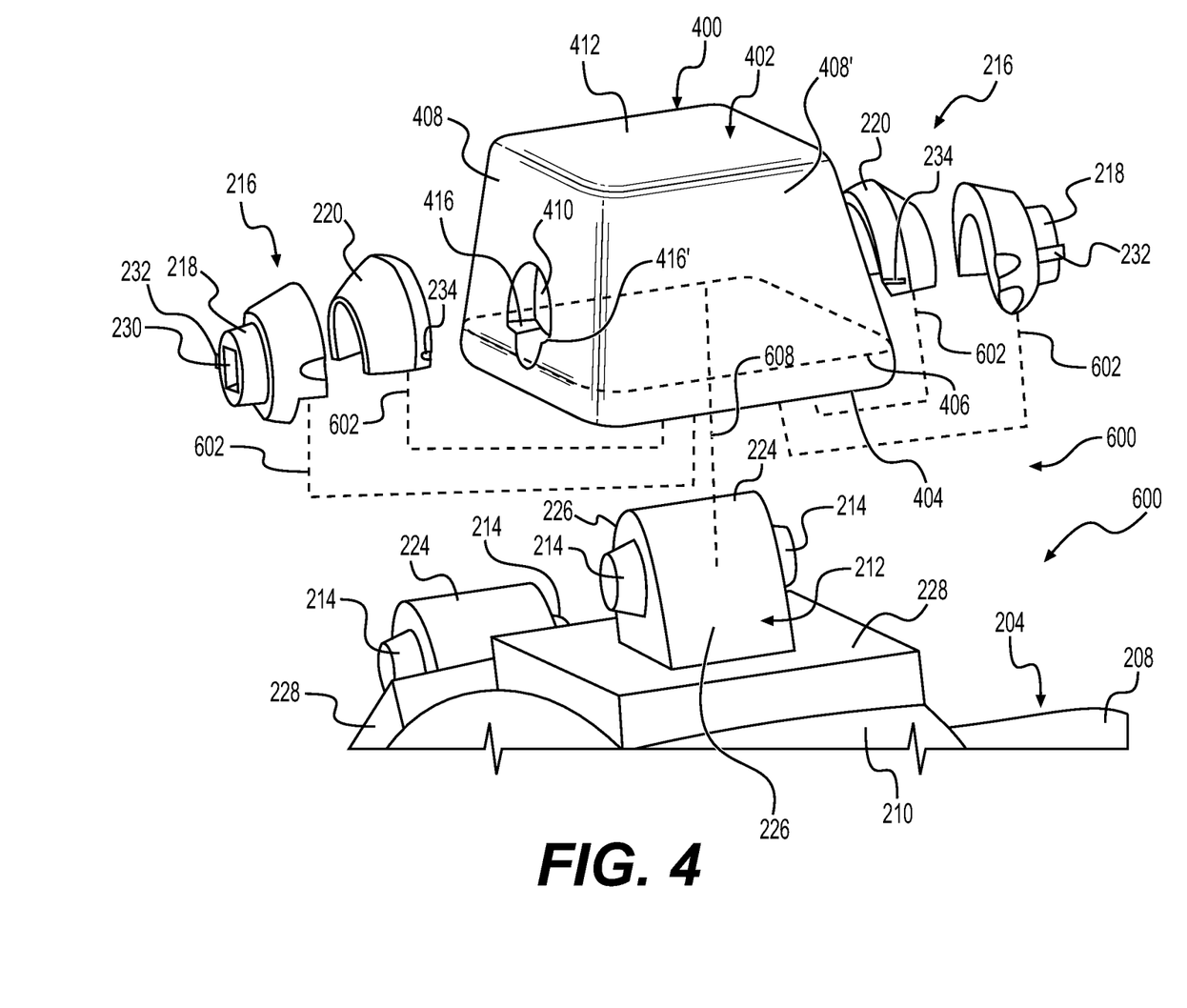
FIG. 4 is an enlarged perspective view of one projection of FIG. 3, illustrating the attachment of a lug to the mounting ears of the projection using side mounted retaining mechanisms.

Turning now to FIGS. 2 thru 4, a sprocket assembly 200 according to an embodiment of the present disclosure may comprise a sprocket rim 204 including a cylindrical annular configuration defining a circumferential direction C, a radial direction R, and an axis of rotation A. The sprocket rim 204 may include a radially inner portion 206 that extends in the radial direction R and in the axial direction A, defining an axial width (best understood with reference to FIG. 5) of the radially inner portion 206 and a radially outer portion 208 that extends along a direction that is parallel to the axis of rotation A, defining an axial width (best understood with reference to FIG. 5) of the radially outer portion 208 that is greater than the axial width of the radially inner portion 206. The radially outer portion 208 also extends along the radial direction R, defining an outer circumferential surface 210. A plurality of projections 212 are attached to the outer circumferential surface 210 and extend radially from the outer circumferential surface 210 in a radially outward direction. Exemplary dimensions for the axial width of the radial inner portion may range from 25 to 100 mm, and may be approximately, 60 mm in some embodiments. Similarly, exemplary dimension for the axial width of the radially outer portion may range from 200 to 800 mm, and may be approximately 510 mm in some embodiments.

Any of these dimensions may be varied as needed or desired in other embodiments.

For the embodiment, shown in FIGS. 2 thru 4, the sprocket rim 204 is separate from the hub 202 (see FIG. 1) and may be attached to the hub 202 via fasteners, welding, etc. Furthermore, the sprocket rim 204 is shown to include a continuous annular circular member. However, it is contemplated that the sprocket rim 204 may be split up into multiple components such that each may be attached or detached to the hub 202 via fasteners or the like, etc.

As best seen in FIGS. 3 and 4, each of the plurality of projections 212 includes at least one mounting ear 214 extending from the projection 212. In some embodiments, each of the plurality of projections 212 includes at least two mounting ears 214 extending from the projection 212 in diametrically opposite directions. For this embodiment, the mounting ears 214 extend along a direction that is parallel to the axis of rotation A. The mounting ears 212 may extend in other directions for other embodiments such as the circumferential direction C or a direction tangent to the circumferential direction C.

Focusing on FIG. 4, the sprocket assembly 200 may also include a lug 400 comprising an enclosure 402 including a bottom surface 404 defining a lug mounting aperture 406 (best seen in FIG. 7) that is configured to receive a projection 212. The enclosure 402 further includes a side surface 408 defining a retaining aperture 410 that is configured to align with the at least one mounting ear 214 of the projection 212.

A retaining mechanism 216 may also be provided for use with the sprocket assembly 200 that is configured to fit within the retaining aperture 410 of the lug 400 and mate with the mounting ear 214. A pair of retaining mechanisms 216, which may be identically or similarly configured, may be provided so that both mounting ears 214 may be used to hold the lug 400 onto the projection 212. The structure of the sprocket rim 204, projections 212, mounting ears 214, retaining mechanisms 216, and lugs 400 shown in FIG. 4 may be symmetrical about a plane that is perpendicular to the axis of rotation A and that is located halfway through the thickness of the sprocket rim 204 along the axis of rotation A. There may also be a plurality of planes of symmetry for all these features extending along the radial directions of the sprocket rim 204.

Figure 8:
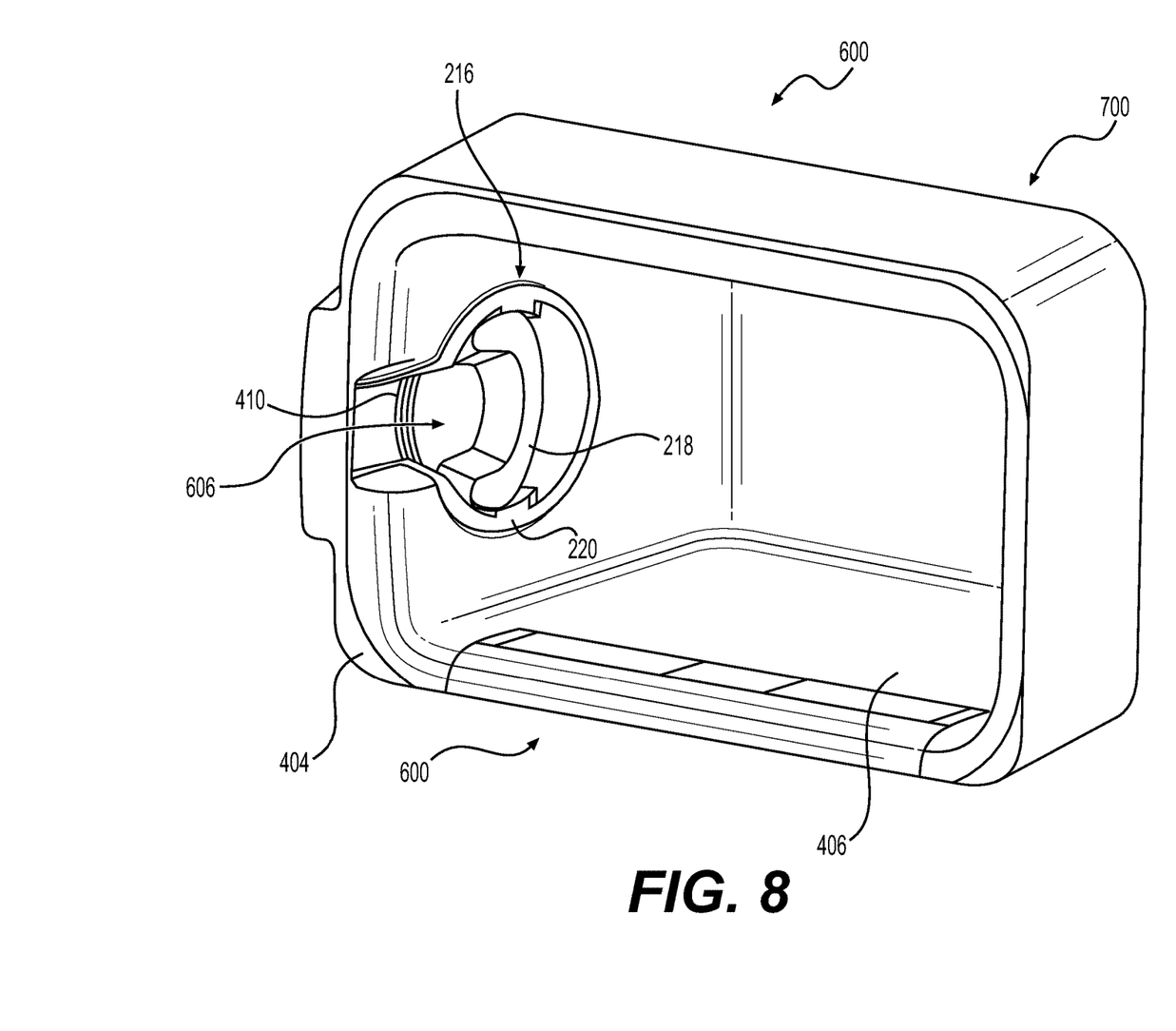
FIG. 8 shows the retaining mechanism fully installed into the retaining aperture of the lug of FIG. 7.
Figure 9:
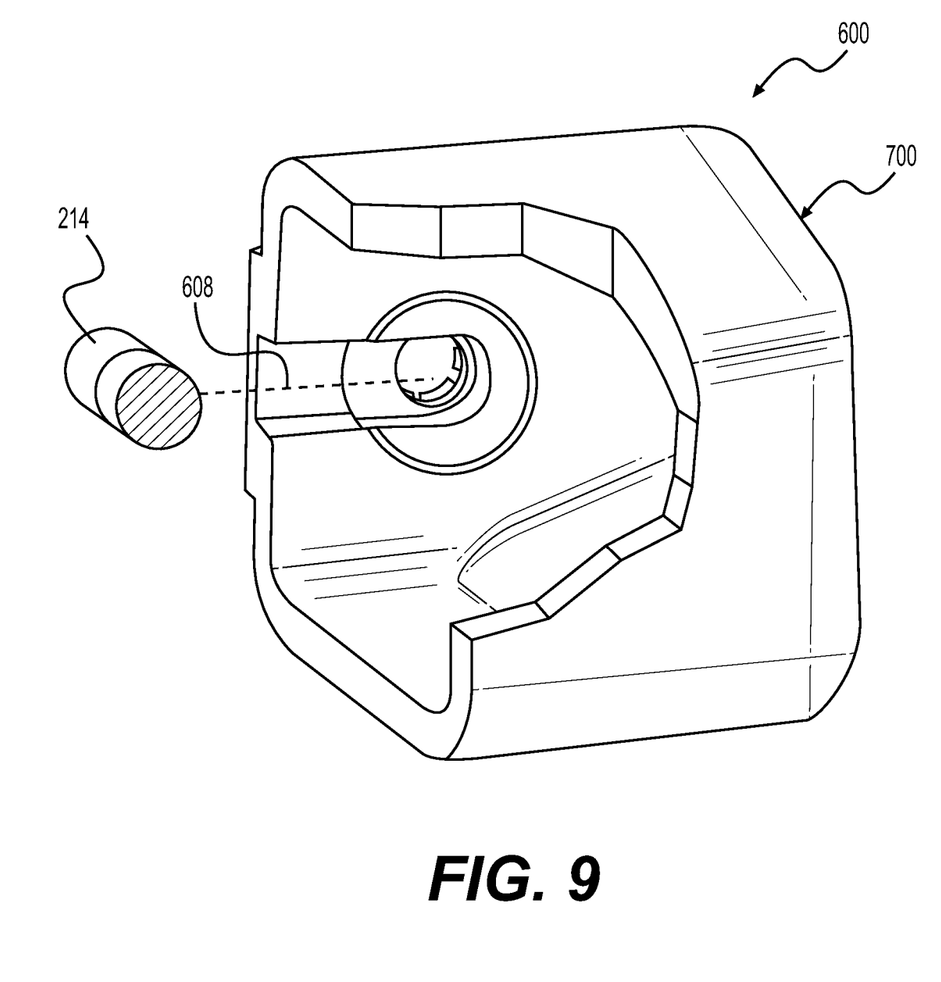
FIG. 9 illustrates the insertion of the ear of the projection, removed from the projection for enhanced clarity, into the slot of the retaining mechanism, with the locking member of the retaining mechanism in an unlocked configuration.
Figure 10:
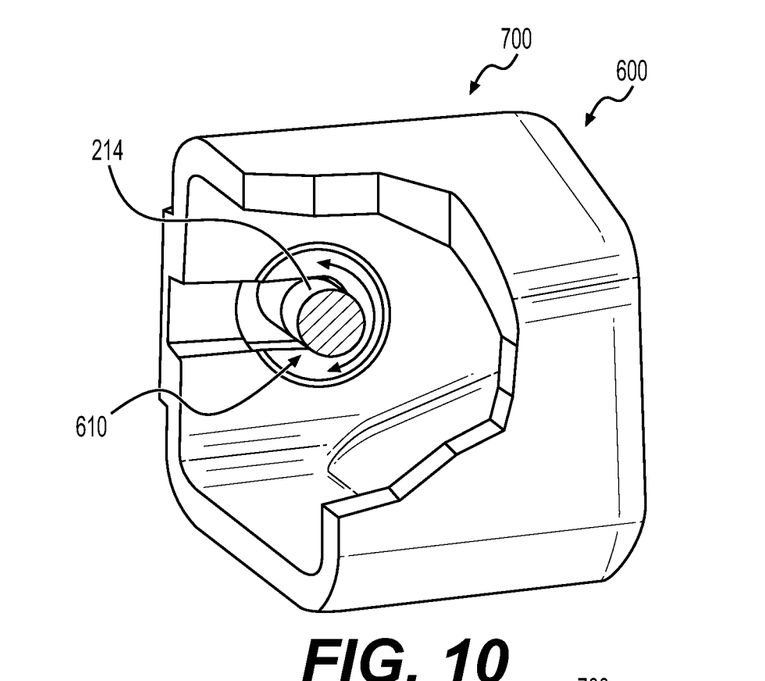
FIG. 10 shows the ear abutting the locking member after being fully inserted into the retaining mechanism of FIG. 9. The locking member is shown in an unlocked configuration.
Figure 11:
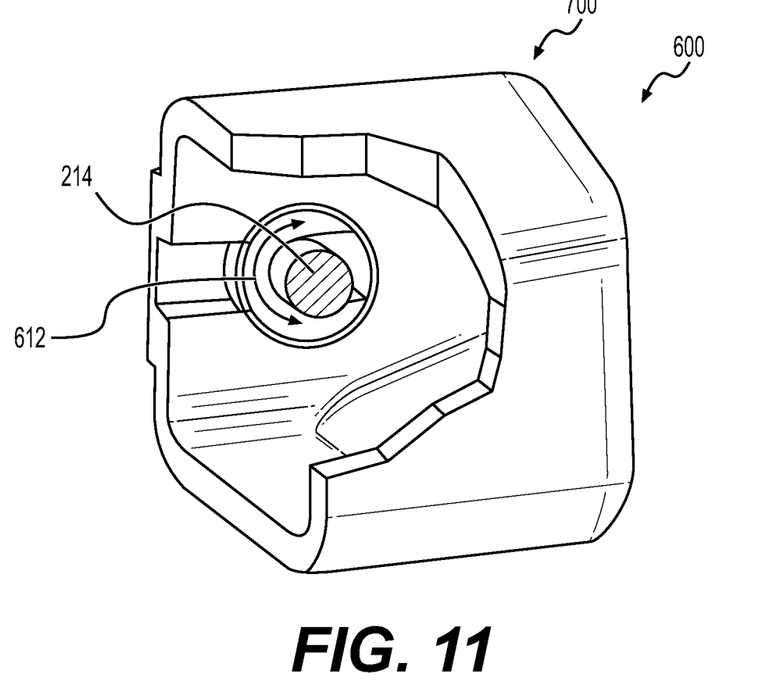
FIG. 11 illustrates the locking member of the retaining mechanism of FIG. 10 in a locked configuration after the locking member has been rotated 180 degrees.

FIGS. 2 and 8 illustrate that the retaining mechanism 216 may be disposed within the retaining aperture 410 and include a lock member 218 and a retaining bushing 220 disposed between the lock member 218 and the lug 400. As will be discussed in more detail later herein, the lock member 218 may be rotated 180 degrees to achieve a locked and unlocked configuration for attaching the lug 400 to and detaching the lug 400 from the projection 212. In some embodiments, the retaining mechanism 216 employed may be sold under the TRADENAME of CAPSURE by the assignee of the present application. Other retaining mechanisms known or that will be devised in the art may be used.

Figure 5:
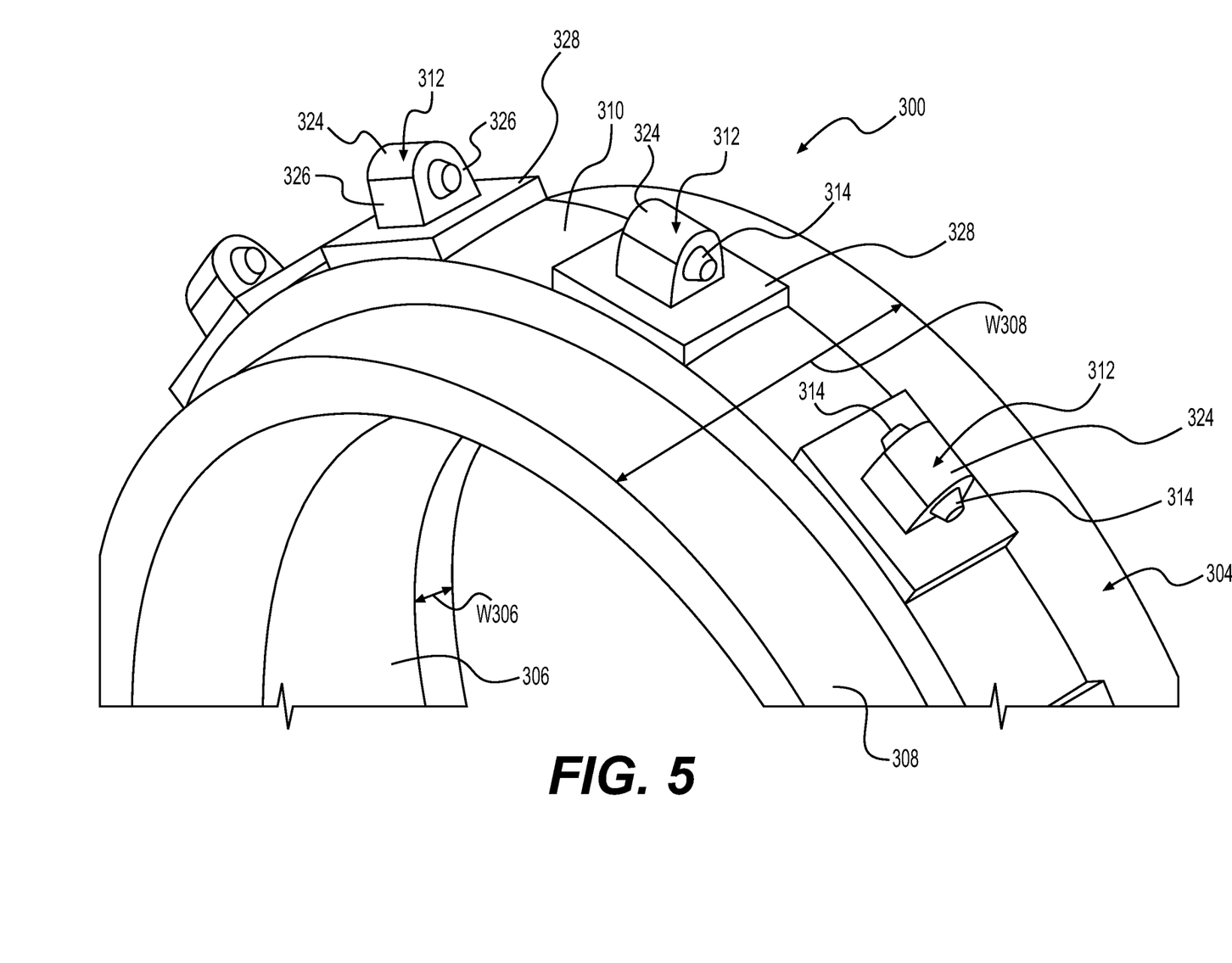
FIG. 5 is a partial perspective view of an alternate embodiment of a sprocket assembly using mounting ears that extend in a direction tangential to the circumferential direction of the sprocket.
Figure 6:
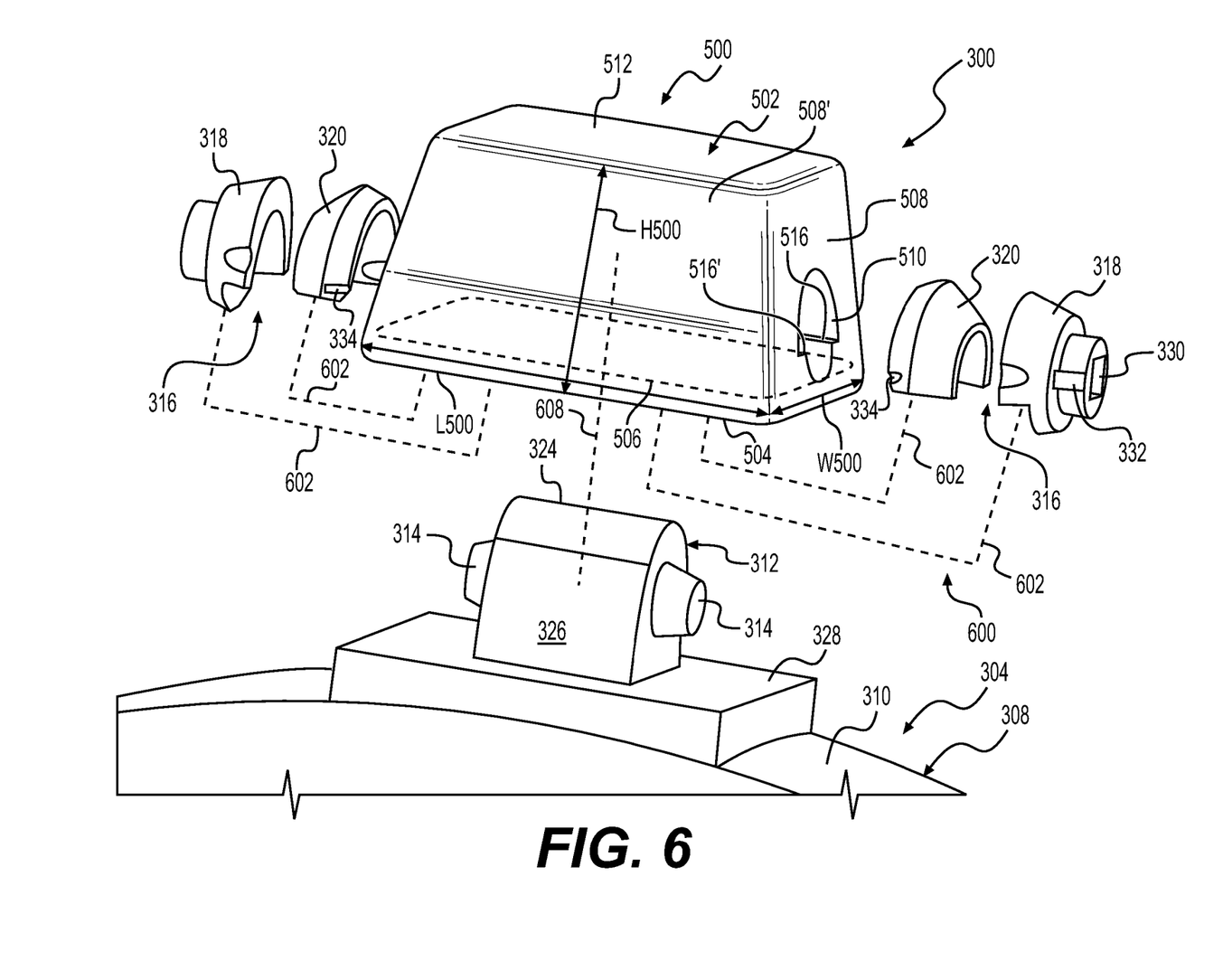
FIG. 6 is an enlarged perspective view of one projection of FIG. 5, illustrating the attachment of a lug to the mounting ears of the projection using circumferentially mounted retaining mechanisms.

Looking now at FIGS. 5 and 6, another embodiment of a sprocket assembly 300 that is similarly constructed to that of FIGS. 2 thru 4 is depicted. The sprocket assembly 300 may comprise a sprocket rim 304 including an at least partial cylindrical configuration defining a circumferential direction C, a radial direction R, and an axis of rotation A. The sprocket rim 304 may include a radially inner portion 306 that extends in the radial direction R and in the axial direction A, and a radially outer portion 308 that along the axial direction A. The radially outer portion 308 may also extend along the radial direction R, defining an outer circumferential surface 310. The radially outer portion 308 may be described as extending primarily in axial direction A since its greatest dimension is in the axial direction A while the radially inner portion 306 may be described as extending primarily in the radial direction R since its greatest dimension is in the radial direction R.

Put another way, the radially inner portion 306 may define an axial width W306 of the radially inner portion 306, and the radially outer portion 308 may define an axial width W308 of the radially outer portion 308 that is greater than the axial width W306 of the radially inner portion 306. This may not be the case for other embodiments of the present disclosure. Exemplary dimensions for W306 may range from 25 to 100 mm for certain embodiments. Exemplary dimensions for W308 may range from 200 to 800 mm in some embodiments. The diameter of the outer circumferential surface 310 may range from 100 to 400 mm for certain embodiments. Any of these dimensions may be varied as needed or desired in other embodiments.

At least one projection 312 may be attached (best seen in FIG. 6) to the outer circumferential surface 310 of the sprocket rim 304 and may extend radially from the outer circumferential surface 310 in a radial outward direction. At least one projection 312 includes at least one mounting ear 314 extending from the projection 312. Again, for this particular embodiment, at least two mounting ears 314 extend from the projection 312 in diametrically opposite directions. For this embodiment, the at least two mounting ears 314 extend in the circumferential direction C or in a direction tangent to the circumferential direction C. The mounting ears 314 may extend in other directions such as along a direction that is parallel to the axis of rotation A.

FIG. 6 shows the use of a lug 500 that is similarly or identically configured to that of FIG. 4 except that the retaining apertures 510 are located in different spots. The lug 500 comprises an enclosure 502 defining a bottom surface 504 defining a lug mounting aperture 506 that is configured to receive the at least one projection 312. The enclosure 502 further includes a side surface 508 defining a retaining aperture 510 that is configured to align with the at least one mounting ear 314 of the at least one projection 312. The length L500 of the lug 500 measured along a direction tangent to the circumferential direction C is greater than the width W500 of lug 500 measured in a direction parallel to the axis of rotation A. The structure of the sprocket rim 304, projections 312, mounting ears 314, retaining mechanisms 316, and lugs 500 shown in FIGS. 5 and 6, may be symmetrical about a plane that is perpendicular to the axis of rotation A and that is located halfway through the thickness of the sprocket rim 304 along the axis of rotation A. There may also be a plurality of planes of symmetry 322 (best understood with reference to FIG. 2) for all these features extending along the radial directions of the sprocket rim 304. The length L500 may range from 50 to 400 mm in some embodiments while the width W500 may range from 100 to 400 mm in some embodiments. The height H500 of the lug 500, measured in a direction perpendicular to the width W500 and the length L500, may range from 50 to 200 mm in some embodiments. Any of these dimensions may be varied as needed or desired in other embodiments.

The sprocket assembly 300 may further comprise a retaining mechanism 316, such as sold under the TRADENAME of CAPSURE by the assignee of the present disclosure, which is configured to fit within the retaining aperture 540 of the lug 500 and mate with the mounting ear 314. FIGS. 6 and 8 illustrate that the retaining mechanism 316 may be disposed within the retaining aperture 510 and include a lock member 318 and a retaining bushing 320 disposed between the lock member 318 and the lug 500. As will be discussed in more detail later herein, the lock member 318 may be rotated 180 degrees to achieve a locked and unlocked configuration for attaching the lug 500 to and detaching the lug 500 from the projection 312.

Various lugs 400, 500 such as those disclosed in FIGS. 4 and 6 may be provided for various reasons such as to provide different configurations, as replacements to replace worn lugs, to provide different materials that exhibit wear properties when used in certain work environments, etc. A lug may be individually provided that is configured to be attached to a projection of a sprocket using a retaining mechanism. In some embodiments, the lug may be used with various sprocket assemblies described herein.

Figure 7:
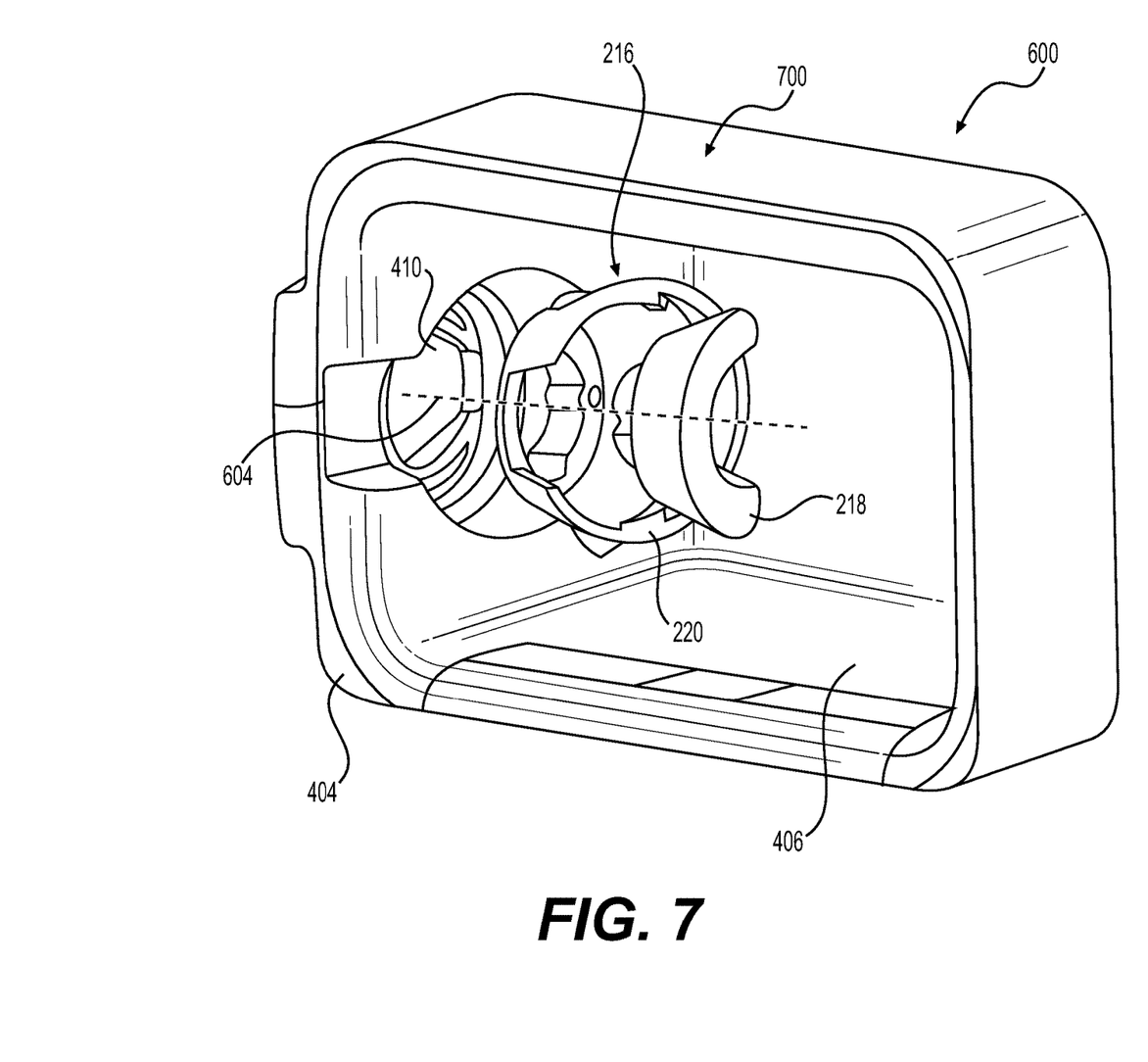
FIG. 7 is a bottom oriented view of a lug similar to that of FIG. 6, showing the retaining mechanism being assembled into the retaining aperture from within the enclosure of the lug.

With reference to FIGS. 4, 6 and 7, a lug 400, 500, 700 may comprise a body forming an enclosure 402, 502 including a bottom surface 404, 504 defining an aperture 406, 506 configured to receive the projection 212, 312, and a side surface 408, 508 defining an aperture 410, 510 configured to receive a retaining mechanism 216, 316. In some embodiments, the body may include a hexahedron configuration. More particularly, the bottom may have a three dimensional rectangular configuration or other regular hexahedron configuration. The bottom surface 404 may be a rectangular surface, and the body may also include a top rectangular surface 412, 512. The surface area of the bottom surface 404, 504 excluding the aperture defined by the bottom surface 404, 504 and the surface area of the top rectangular surface 412, 512 may be within 60% of each other. In some embodiments, the surface area of the top rectangular surface 412, 512 may be within 80% or more of the surface area of the bottom surface 404, 504 in some embodiments.

As best seen with reference to FIGS. 4 and 6, the body of the lug 400, 500 may define a first side surface 408, 508' with greater surface area and a second side surface 408', 508 with less surface area and the aperture 410, 510 that is configured to receive the retaining mechanism 216, 316 may be defined by the first side surface 408, 508' with greater surface area. In other embodiments, the aperture 410, 510 that is configured to receive the retaining mechanism 216, 316 is defined by the second side surface 408', 508 with less surface area.

For many embodiments, the sprocket rim may be cast using iron, grey-iron, steel or other suitable materials. The lugs may also be cast using iron, grey-iron, steel or other suitable materials. The lug may be made from a different material than the sprocket rim. Since the lugs are smaller than the sprocket rim, a material may be used to form the lugs that is difficult to use in larger castings. Other manufacturing processes may be used to make the lugs such as any type of machining, forging, etc. For example, steel or "tough steel" may be used to create the lugs. Lugs may also be coated, heat treated, etc. to provide suitable characteristics for various applications.

Referring back to FIGS. 4 and 6, the projections 212, 312 are shown to be similarly configured except that they are oriented differently. That is to say, the projection 212 of FIG. 4 extends predominantly in a direction that is parallel to the axis of rotation A while the projection 312 of FIG. 6 extends predominantly circumferentially or in a direction that is tangential to the circumferential direction C. The ears 214, 314 have a conical configuration while the projections 212, 312 have a rounded free end 224, 324 that connects via sloped sidewalls 226, 326 to pads 228, 328 spaced about the circumference of the outer circumferential surface 210, 310. Various features and modifications, such as draft, may be made to the projections 212, 312 and ears 214, 314 to facilitate casting depending on the orientation of these features. The aperture 406, 506 of the lug 400, 500 that is configured to receive the projection 212, 312 may be partially or completely complimentarily shaped to the projection.

INDUSTRIAL APPLICABILITY

In practice, a sprocket assembly, a sprocket rim, a hub, a retaining mechanism, or a lug according to any embodiment described herein may be sold, bought, manufactured or otherwise obtained in an OEM or after-market context.

Referring now to FIGS. 4, 6 and 7 thru 11, a method 600 of assembling a sprocket assembly 200, 300 may be understood. A sprocket rim member 204, 304 may be provided to which a projection 212, 312 is attached or integrally formed therewith. Then, a lug 400, 500 may be attached to the projection 212, 312 using a retaining mechanism 216, 316 including a lock member 218, 318 and a retaining bushing 220, 320 as follows. The retaining mechanism 216, 316 may be inserted into the bottom aperture 406, 506 of the lug 400, 500 (step 602, see FIGS. 4 and 6) and then inserted into a side aperture of the lug (step 604, see FIG. 7) and held therein (step 606, see FIG. 8). Next, the lug 400, 500 is inserted over the projection 212, 312 with the mounting ear 214, 314 of the projection 212, 312 aligned with a slot 414, 514 on the inside of the enclosure 402, 502 of the lug 400, 500 and the lock member 218, 318 in the unlocked configuration (step 608, see FIG. 9). This movement continues until the ear 214, 314 bottoms out on the locking member 218, 318 (step 610, see FIG. 10). Then, the locking member is rotated 180 degrees until the locking member is a locked configuration (step 612, see FIG. 10).

Rotation of the locking member may be achieved by inserting a square shaped drive head of a wrench (not shown) or similar tool into a complimentarily shaped pocket 230, 330 of the lock member 218, 318 (see FIGS. 4 and 6). Then, the lock member 218, 318 is rotated from one position (e.g. unlocked configuration), where its stop 232, 332 contacts the ledge 416, 516 of the aperture 410, 510 to the opposite ledge 416', 516' of the aperture 410, 510 (e.g. locked configuration). In either extreme position (locked or unlocked configuration), detents 234, 334 on the retaining bushing 220, 320 hold the locking member 218, 318 in position unless sufficient torque is provided to move the locking member to overcome the detent force. This helps to ensure that the lug will not fall off the projection unintentionally due to vibration, etc. The locking and unlocking of the retaining mechanism is repeated if there are two such retaining mechanisms used to hold the lug onto the projection.

While sprocket assemblies that are used to drive a chain assembly have been described in detail, it is to be understood that sprocket assemblies are also considered to be within the scope of the present application. Any of the components or features disclosed herein may be altered compared to what has been specifically described in this specification or shown in the figures as needed or desired.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A sprocket assembly comprising:
 a sprocket rim including a cylindrical annular configuration defining a circumferential direction, a radial direction, and an axis of rotation, the sprocket rim including
  a radially inner portion that extends in the radial direction and in the axial direction, defining an axial width of the radially inner portion;
  a radially outer portion that extends in the axial direction, defining an axial width of the radially outer portion that is greater than the axial width of the radially inner portion, the radially outer portion also extending along the radial direction, defining an outer circumferential surface; and a plurality of projections attached to the outer circumferential surface and extending radially from the outer circumferential surface.

2. The sprocket assembly of claim 1 wherein each of the plurality of projections includes at least one mounting ear extending from the projection.

3. The sprocket assembly of claim 2 wherein each of the plurality of projections includes at least two mounting ears extending from the projection in diametrically opposite directions.

4. The sprocket assembly of claim 2 further comprising a lug comprising an enclosure including a bottom surface defining a lug mounting aperture that is configured to receive one of the plurality of projections, the enclosure further including a side surface defining a retaining aperture that is configured to align with the at least one mounting ear of the projection.

5. The sprocket assembly of claim 4 further comprising a retaining mechanism that is configured to fit within the retaining aperture of the lug and mate with the mounting ear.

6. The sprocket assembly of claim 5 wherein the retaining mechanism is disposed within the retaining aperture and includes a lock member and a retaining bushing disposed between the lock member and the lug.

7. The sprocket assembly of claim 3 wherein the mounting ears extend along a direction that is tangential to the circumferential direction.

8. The sprocket assembly of claim 3 wherein the mounting ears extend along a direction that is parallel to the axis of rotation.

9. A sprocket assembly comprising:
a sprocket rim including an at least partial cylindrical configuration defining a circumferential direction, a radial direction, and an axis of rotation, the sprocket rim including
a radially inner portion that extends in the radial direction and in the axial direction;
a radially outer portion that extends along the axial direction, the radially outer portion also extending along the radial direction, defining an outer circumferential surface; and
at least one projection attached to the outer circumferential surface and extending radially from the outer circumferential surface wherein the at least one projection includes at least one mounting ear extending from the projection.

10. The sprocket assembly of claim 9 wherein the radially inner portion defines an axial width of the radially inner portion, and the radially outer portion defines an axial width of the radially outer portion that is greater than the axial width of the radially inner portion.

11. The sprocket assembly of claim 9 wherein the at least one projection includes at least two mounting ears extending from the projection in diametrically opposite directions.

12. The sprocket assembly of claim 9 further comprising a lug comprising an enclosure defining a bottom surface defining a lug mounting aperture that is configured to receive the at least one projection, the enclosure further including a side surface defining a retaining aperture that is configured to align with the at least one mounting ear of the at least one projection.

13. The sprocket assembly of claim 12 further comprising a retaining mechanism that is configured to fit within the retaining aperture of the lug and mate with the mounting ear.

14. The sprocket assembly of claim 13 wherein the retaining mechanism is disposed within the retaining aperture and includes a lock member and a retaining bushing disposed between the lock member and the lug.

15. The sprocket assembly of claim 11 wherein the mounting ears extend along a direction that is tangential to the circumferential direction.

16. The sprocket assembly of claim 11 wherein the mounting ears extend along a direction that is parallel to the axis of rotation.

17. A lug configured to be attached to a projection of a sprocket using a retaining mechanism, the lug comprising:
an enclosure including
a bottom surface defining an aperture configured to receive the projection; and
a side surface defining an aperture configured to receive the retaining mechanism;
wherein the body includes a hexahedron configuration, the bottom surface is a rectangular surface, and the body also includes a top rectangular surface, and the surface area of the bottom surface excluding the aperture defined by the bottom surface and the surface area of the top rectangular surface are within 80% of each other, and the body defines a first side surface with greater surface area and a second side surface with less surface area and the aperture that is configured to receive the retaining mechanism is defined by the first side surface with greater surface area.

* * * * *